(No Model.) 2 Sheets—Sheet 1.
B. J. CURRY.
PLANTER AND CULTIVATOR.

No. 327,434. Patented Sept. 29, 1885.

Attest.
F. H. Schott
A. R. Brown.

Inventor:
Burwell J. Curry.
Per John C. Tasker atty.

(No Model.) 2 Sheets—Sheet 2.

B. J. CURRY.
PLANTER AND CULTIVATOR.

No. 327,434. Patented Sept. 29, 1885.

Attest:
F. H. Schott
A. R. Brown

Inventor:
Burwell J. Curry
per J. C. Faister atty

UNITED STATES PATENT OFFICE.

BURWELL J. CURRY, OF HUNTSVILLE, ALABAMA.

PLANTER AND CULTIVATOR.

SPECIFICATION forming part of Letters Patent No. 327,434, dated September 29, 1885.

Application filed January 30, 1885. (No model.)

*To all whom it may concern:*

Be it known that I, BURWELL J. CURRY, a citizen of the United States, residing at Huntsville, in the county of Madison and State of Alabama, have invented certain new and useful Improvements in Planters and Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my present invention is to provide an improved cotton-cultivator that can be used for simultaneously fertilizing, bedding, planting, and covering the seed, and which may be readily adapted for use as a cotton chopper and cultivator. This object is attained by the mechanism and the combination of devices illustrated in the annexed drawings, in which—

Figure 1:
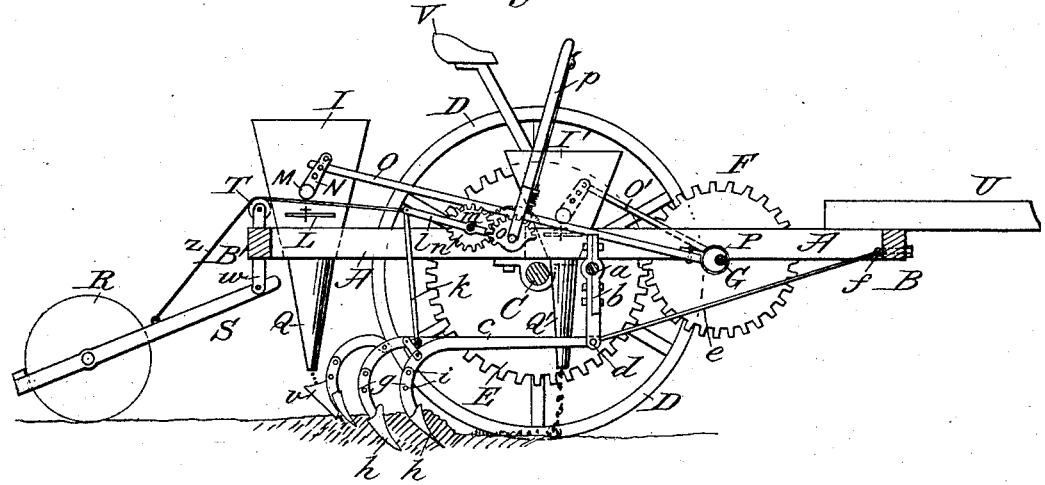
Figure 2:
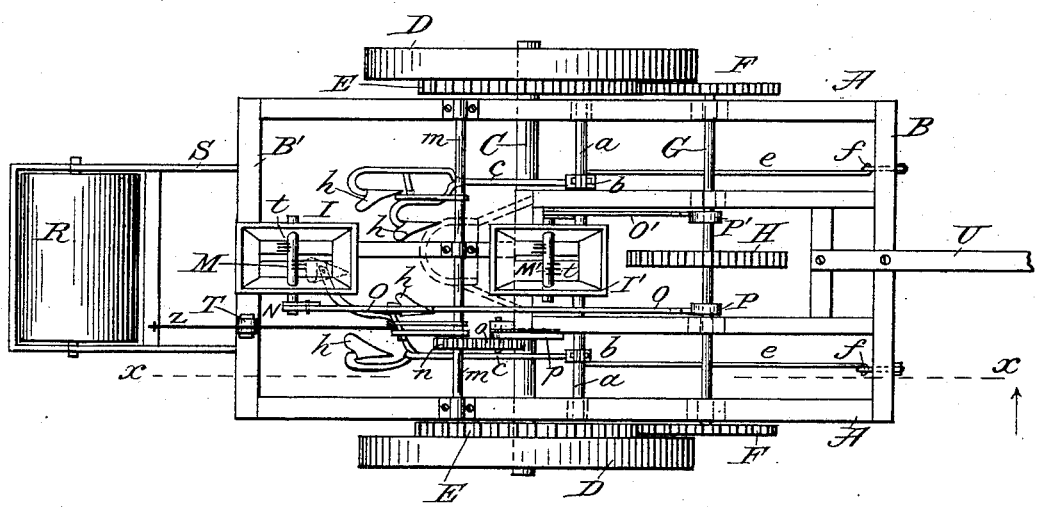
Figure 3:
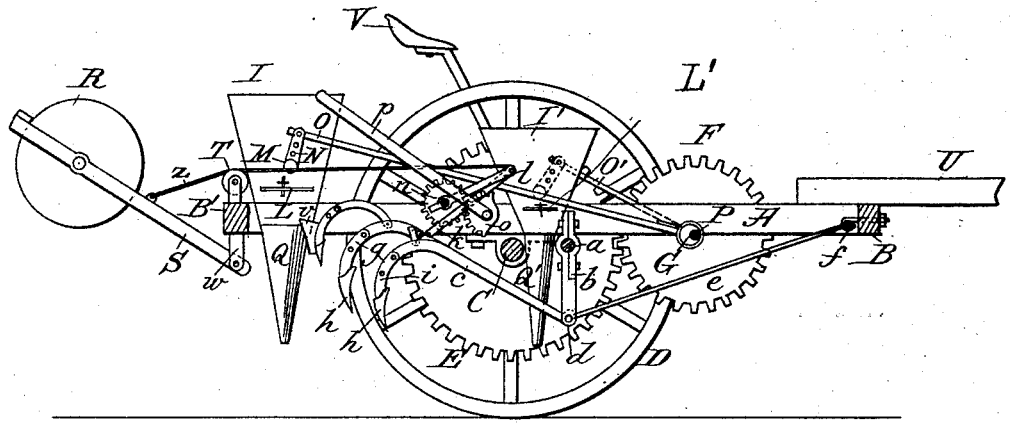
Figure 4:
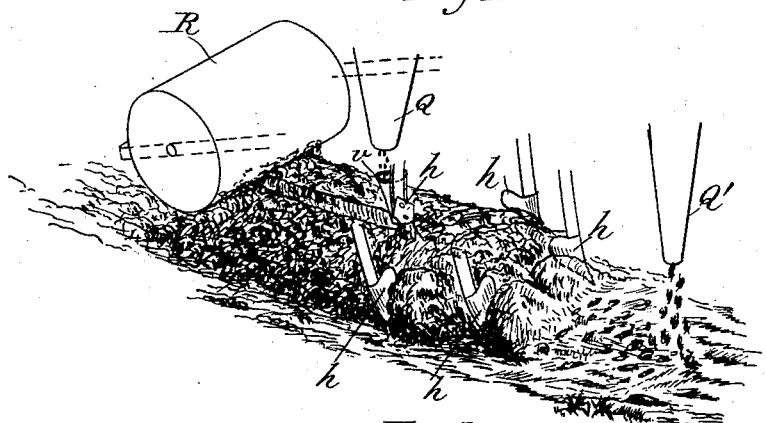
Figure 5:
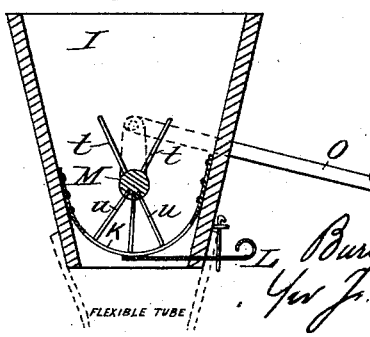

Figure 1 is a sectional side elevation of my improved cotton-cultivator on the line $x\ x$ of Fig. 2, the machine being shown as arranged for fertilizing, bedding, drilling, and covering at one operation. Fig. 2 is a plan view of my improved cultivator. Fig. 3 is a sectional side elevation of the machine, showing the cultivators, drill, and covering-roller elevated away from operative contact with the soil. Fig. 4 illustrates the operation of my improved machine in simultaneously fertilizing, bedding, or preparing the land, planting and covering the seed. Fig. 5 represents a vertical section through either the seed-hopper or the fertilizer-hopper, the construction of both being the same.

Like letters designate like parts in the several views.

The frame of the machine consists of the longitudinal beams A A and the front and rear cross-bars, B B', and it is supported on an axle, C, having wheels D D, as usual. Within these wheels and revolving therewith are the large gear-wheels E E, which mesh with the small gears or pinions F F, that are placed one on each end of a shaft, G, that is journaled near one end of the machine. This shaft G is provided centrally with a gear, H, that may be arranged to actuate the chopper mechanism in either of the ways shown in my former patents, No. 260,458, dated July 4, 1882, or No. 284,389, dated September 4, 1883. In the present machine, however, the choppers are not shown, the machine being arranged instead for fertilizing, bedding, planting, and covering, all of which acts are performed at one operation, as hereinafter described.

The longitudinal bars or beams A A support a transverse shaft, $a$, to which at proper intervals are attached the two-part box-pendants $b\ b$, that are connected by bolts and nuts in any suitable manner. The lower ends of these pendants $b\ b$ are slotted or bifurcated, as described in my former patent, No. 299,627, dated June 3, 1884, for receiving the ends of the cultivator stocks or beams $c\ c$, which are pivotally secured therein by means of a bolt or pin, $d$, that also connects the pendant to the clevis end of a brace-rod, $e$, the forward end of which is connected by an eyebolt, $f$, to the front cross-bar, B, of the machine-frame. The construction of the cultivator-stocks $c\ c$, together with their shanks $g\ g$ and cultivator-blades $h\ h$, is or may be similar to that shown in my former patent, No. 299,627, above referred to, the cultivator-shanks being connected to the stocks by pins or bolts $i\ i$, one of which is arranged to break and allow the shank to turn back on the other as a pivot without injury to the cultivator-blade in case it should come forcibly in contact with any unyielding substance. To each set of cultivators is pivoted a connecting-rod, $k$, the upper end of which is pivoted to the end of an arm, $l$, that is adjustably clutched to a rock-shaft, $m$, journaled to the frame of the machine. This rock-shaft carries a gear, $n$, that meshes with a segment-gear, $o$, on a pawl-lever, $p$, for raising or lowering the cultivators and securing them in the position to which they may have been adjusted.

At the rear end of the machine is a seed-hopper, I, in the bottom of which is a seed-slot or feed-opening, K, that can be partially or wholly closed, as desired, by means of a gate or slide, L, Fig. 5, arranged in any suitable manner, so as to control the discharge of seed. The hopper-bottom with the slot K is preferably formed on a curve, as shown in Fig. 5, so as to facilitate the exit of the seed. Within the hopper I, at a right angle to the slot K and above the same, is a shaft, M, to which a semi-rotary movement is imparted by a crank, N, at one end, which is connected by a rod or pitman, O, to an eccentric, P, on the rotary shaft G. The shaft M carries on its upper side, near each end, a number of fingers or stirrers, $t\ t$, for agitating the seed in the hopper and preventing it from becoming compacted, while on the under side of the shaft M, in a line with the slot K, are several clearing-fingers, $u\ u$, that work in the feed-slot and keep it clear for the exit of seed. The crank N and pitman or eccentric rod O have an adjustable and detachable connection, and the pitman is also detachably connected to the eccentric P, so that the parts can be readily adjusted or disconnected when desired. The seed-hopper is also detachably connected to the frame of the machine. To the lower part of the seed-hopper is attached a flexible tube or spout, Q, composed of rubber, leather, or other suitable material, which spout conducts the seed to a drill-point, $v$, that is carried by one of the cultivator-stocks, as shown in Figs. 1 and 4.

About the center of the machine, and in line with the seed-hopper I, is another hopper, I', of similar construction, arranged for the distribution of a fertilizer in advance of the seed-dropping mechanism. The fertilizer-hopper I' is provided with a feed-slot, closed by a gate, L', and also with a shaft, M', having stirring and clearing fingers similar to those arranged in the seed-hopper, the shaft M' being actuated from an eccentric, P', on the shaft G by means of an eccentric-rod, O', and crank N', similar to those that actuate the seed-dropping devices. The fertilizer-hopper I' is also provided with a discharge spout or tube, Q', which, like the spout Q, attached to the seed-hopper I, is made of leather, rubber, or other flexible material, so as to avoid the liability of its being injured by coming in contact with any obstruction.

A covering-roller, R, is journaled in a frame, S, that is detachably pivoted to straps or pendants $w\ w$, secured to the rear cross-beam, B'. To the roller-frame S is attached a chain or rope, $z$, that passes over a pulley, T, journaled above the rear cross-beam, the forward end of the chain being secured to an arm of the rock-shaft $m$, so that when the lever $p$ is moved to raise or lower the cultivator a corresponding movement will also be imparted to the covering-roller. The cultivators and covering-roller can thus be simultaneously raised by one movement of the lever $p$ when it is necessary to turn the machine at the end of the furrow, or when it is desired to transport it from place to place.

V is the driver's seat, and U is the tongue of the machine.

It will be observed that the cultivator stocks or beams are arranged parallel with each other and with the longitudinal beams of the machine, but are of different lengths, so that one cultivator will follow another along the opposite sides of the furrow. It is obvious that the cultivator-beams can be provided with turning-shovels for bedding the land, or with any suitable kind of cultivating implement, according to the nature of the work required.

The operation of the machine and the manner of using it for fertilizing, bedding, planting, and covering the seed, and in chopping out or thinning and cultivating the young plants, will be readily understood.

With a machine of this construction it is obvious that the operations of bedding the land, distributing the fertilizer, and depositing and covering the seed can all be carried on at once, thus effecting a great saving in time and labor. This is an especial advantage in the culture of cotton, though it is apparent that the machine is also well adapted to the cultivation of other crops.

The simultaneous operation of the devices for bedding the land, fertilizing, planting, and covering is clearly illustrated in Fig. 4. The hoppers I and I' being respectively supplied with seed and with a fertilizer and the machine set in motion, a quantity of the seed and of the fertilizer, as regulated by the adjustment of the gates L L', Fig. 5, will be conducted through the spouts Q Q', as shown in Figs. 1 and 4. The cultivator-beams with attached bedding-points, being at the same time lowered in contact with the soil—which has preferably lain fallow for some time—will bed the same properly for the reception of the fertilizer and the seed, the latter being conducted by the spout Q to the drill-point $v$, through which it passes into the soil. The furrow made by the blade or share $h'$ and drill-point $v$ is covered by the roller R, attached to the rear end of the machine, thus completing the operation of planting, all the steps of which are simultaneously performed by the one machine. During this operation the semi-rotary movements of the shafts M M' and attached fingers agitate the fertilizer and the seed in their respective hoppers and cause them to be discharged freely and uniformly. By one movement of the lever $p$ the cultivators and the covering-roller can be raised or lowered together at the will of the driver, and by adjusting the slides L L' the discharge of fertilizer and seed can be regulated or discontinued as required.

When the young plants are in condition to be thinned out and cultivated, the covering-roller R and its frame are detached and the bedding-shovels may be replaced by cultivators of other required form, or by chopping hoes or blades arranged to be actuated from the shaft G and gear H in a manner similar to that described in my former patents, No. 260,458 or No. 284,389.

All the parts of the machine, including the hoppers, are readily detachable, so that it can be easily and quickly arranged for use as a fertilizer-distributer or as a planter, either separately or combined, or for the purpose of simultaneously bedding, fertilizing, drilling, and covering, or for use as a cotton-chopper or an ordinary wheel-cultivator, as may be required.

It will be seen that when the machine is used as a cultivator the blades $h\ h$ are held to a uniform depth in the soil by means of the rods $k\ l$ and intermeshing gears $m\ o$, which are rigidly locked by the engagement of the pawl-lever $p$ with its rack. I can thus elevate or depress the plows to cut at any desired depth, and rigidly confine them at the desired elevation, so as to cultivate the entire field at a uniform depth, notwithstanding the usual inequalities in the condition or hardness of the soil, thus obviating a common difficulty heretofore experienced in the use of pivoted cultivator-beams.

Having thus described my invention, what I claim as new, and desire to secure by Letters Patent, is—

1. In a cultivator, the combination of the hopper I, having a feed-slot, K, adjustable gate L, and flexible spout Q, the semi-rotary shaft M, provided with fingers $t\ t$ and $u\ u$, the crank N, pitman O, eccentric P, and rotary shaft G, journaled in the frame A, and carrying at each end a pinion, F, which meshes with a gear, E, upon the driving-wheel, whereby the said shaft is operated, substantially in the manner and for the purpose shown and described.

2. In a cultivator, the combination, with the cultivator-beams $c\ c$, rock-shaft $m$, having adjustable arms $l\ l$, and the rods or bars $k\ k$, of the covering-roller R, pivoted frame S, chain $z$, lever $p$, and gears $n\ o$, whereby the roller and cultivators can be simultaneously raised or lowered, substantially as described.

In testimony whereof I affix my signature in presence of two witnesses.

BURWELL J. CURRY.

Witnesses:
J. T. McGEHEE,
OSCAR FULGHAM.